(12) United States Patent
Greco (10) Patent No.: US 10,235,394 B2
(45) Date of Patent: *Mar. 19, 2019

(54) MANAGING RELATIONAL DATABASES (71) Applicant: International Business Machines Corporation, Armonk, NY (US)

(72) Inventor: Marco Greco, Staines (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,072

(22) Filed: Nov. 28, 2016

(65) Prior Publication Data
US 2017/0075930 A1    Mar. 16, 2017

Related U.S. Application Data (63) Continuation of application No. 14/847,342, filed on Sep. 8, 2015.

(51) Int. Cl.
*G06F 17/30* (2006.01)

(52) U.S. Cl.
CPC .. *G06F 17/30292* (2013.01); *G06F 17/30339* (2013.01); *G06F 17/30584* (2013.01); *G06F 17/30595* (2013.01)

(58) Field of Classification Search
CPC ......... G06F 17/30292; G06F 17/30339; G06F 17/30595; G06F 17/30584
See application file for complete search history.

(56) References Cited

U.S. PATENT DOCUMENTS

| | | | |
|---|---|---|---|
| 7,890,541 B2 | 2/2011 | Teng et al. | |
| 8,135,688 B2 | 3/2012 | Shankar et al. | |
| 8,209,294 B2 | 6/2012 | Shankar et al. | |
| 8,615,503 B2 | 12/2013 | Adyilamuriyil et al. | |
| 2003/0055822 A1* | 3/2003 | Yu | G06F 17/30371 |
| 2006/0136493 A1 | 6/2006 | Muralidharan et al. | |
| 2006/0206507 A1* | 9/2006 | Dahbour | G06F 17/30604 |
| 2007/0198591 A1* | 8/2007 | Teng | G06F 17/30339 |
| 2009/0100089 A1* | 4/2009 | Eadon | G06F 17/30486 |

(Continued)

OTHER PUBLICATIONS

Adayilamuriyil et al., "Policy Based Automatic Physical Schema Management", U.S. Appl. No. 14/051260, filed Oct. 10, 2013, pp. 1-58.

(Continued)

*Primary Examiner* — Jorge A Casanova
(74) *Attorney, Agent, or Firm* — Gilbert Harmon, Jr.

(57) ABSTRACT

Embodiments for an approach to managing a relational database. The relational database comprises a first table defining a primary key, and at least one other table with a foreign key constraint referencing the primary key. The data of the first table and at least one other table is divided into a plurality of partitions, each containing data associated with a subset of primary key values. Receiving a partition management policy, defining one or more conditions for the first table and at least one other table and an operation performed on the partitions of the first table and at least one other table. Determining if the first table and at least one other table satisfy the one or more conditions of the partition management policy, if not, performing the operation.

7 Claims, 4 Drawing Sheets

(56) References Cited

U.S. PATENT DOCUMENTS

| | | |
|---|---|---|
| 2012/0158650 A1* | 6/2012 | Andre ............... G06F 17/30575 707/611 |
| 2012/0266210 A1 | 10/2012 | Jones et al. |
| 2013/0006950 A1 | 1/2013 | Adayilamuriyil et al. |
| 2014/0052749 A1 | 2/2014 | Rissanen |
| 2014/0122484 A1* | 5/2014 | Jagtiani ............. G06F 17/30339 707/737 |
| 2015/0106375 A1 | 4/2015 | Adayilamuriyil et al. |
| 2015/0106407 A1 | 4/2015 | Adayilamuriyil et al. |

OTHER PUBLICATIONS

Seeger et al., "DB2 V10.1 Multi-temperature Data Management Recommendations", IBM® DB2® for Linux®, UNIX®, and Windows®, Issued: Apr. 2012, pp. 1-48.

Unknown, "About Deletes", Apache Cassandra™ 2.0, <http://docs.datastax.com/en/cassandra/2.0/cassandra/dml/dml_about_deletes_c.html>, printed Aug. 13, 2015 11:00 AM, 1 page.

Greco, Marco, "Managing Relational Databases" U.S. Appl. No. 14/847,342, filed Sep. 8, 2015, 33 pages.

IBM Appendix P, list of patents or patent applications treated as related, dated Nov. 17, 2016, 2 pages.

\* cited by examiner

MANAGING RELATIONAL DATABASES

BACKGROUND OF THE INVENTION

The present invention relates generally to the management of relational databases and more specifically to policy based automatic schema management for relational models.

Table partitioning is a well-known technique for space and data management of relational databases, in particular where a table of a relational database contains data that changes in operational importance over time. The table stores time-dependent data, for example data about financial transactions, each of which will have an associated date and time on which the transaction occurred. It may be deemed that only the last 5 months data is required, and that any older data can be discarded or archived.

In this way, the space required for the data of the table is managed. As an entire partition can be removed at once, this can be done much more efficiently than would be possible by deleting records individually.

However, space management can only be defined for any particular table in isolation. In addition, partition management policies cannot be used for tables that have primary key constraints that are referenced by other tables. This is because discarding a partition could lead to primary keys being discarded that are referenced by data in the other tables, leaving the other tables with dangling rows (i.e. rows that reference a primary key that no longer exists in the referenced table), causing foreign key constraint violations.

SUMMARY

According to an embodiment of the present invention, a computer-implemented method for managing a relational database, the relational database comprising: a first table on which is defined a primary key, wherein data associated with the first table is divided into a first plurality of partitions; at least one other table with a foreign key constraint that references the primary key of the first table, wherein data associated with the at least one other table is divided into a second plurality of partitions; wherein each of the first plurality of partitions and each of the second plurality of partitions comprises data associated with a subset of values of the primary key; and the method comprising: receiving a partition management policy, the partition management policy defining one or more conditions for the first table and the at least one other table and an operation to be performed upon the each of the first plurality of partitions and each of the second plurality of partitions; determining if the first table and the at least one other table satisfy the one or more conditions of the partition management policy; and responsive to determining the one or more conditions of the partition management policy are not satisfied, performing the operation upon each of the first plurality of partitions and each of the second plurality of partitions.

DETAILED DESCRIPTION

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
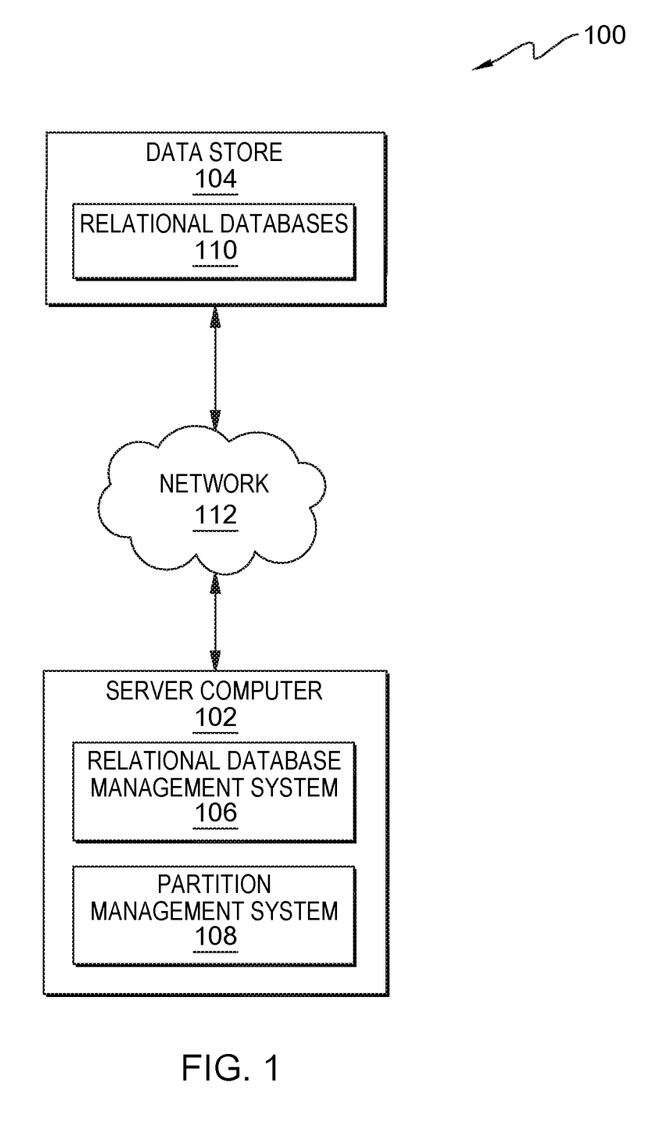
FIG. 1 is a schematic diagram of a computer system comprising a relational database management system, in accordance with an embodiment of the present invention.

A computer system 100 in accordance with an embodiment of the present invention is shown in FIG. 1. The computer system 100 comprises a server computer 102, which is in communication with a data store 104 on which is stored data for one or more relational databases 110 via network 112. The server computer 102 has running upon it a relational database management system (RDBMS) 106 that manages the relational databases 110 on the data store 104, and which comprises a partition management system 108 which operates as described in more detail below.

Data store 104 can be any type of computer system, e.g., client computer, server computer, workstation, etc., suitable for operation in a relational database environment and capable of communicating with a server computer 102 via network 112. Data store 104 comprises one or more relational databases 110 configured for use in a policy based automatic schema management for relational models system. Data store 104 can include internal and external hardware components, as depicted and described in further detail with respect to FIG. 4.

Network 112 can be, for example, a local area network (LAN), a wide area network (WAN) such as the Internet, or a combination of the two, and can include wired, wireless, or fiber optic connections. In general, network 112 can be any combination of connections and protocols that will support communications between data store 104 and server computer 102.

Server computer 102 can be a standalone computing device, management server, a web server, a mobile computing device, or any other electronic device or computing system capable of receiving, sending, and processing data. In other embodiments, server computer 102 can represent a server computing system utilizing multiple computers as a server system. In another embodiment, server computing device can be a laptop computer, a tablet computer, a netbook computer, a personal computer, a desktop computer, or any programmable electronic device capable of communicating with other computing devices (not shown) within computer system 100 environment via network 104. In another embodiment, server computing device 102 represents a computing system utilizing clustered computers and components (e.g., database server computers, application server computers, etc.) that act as a single pool of seamless resources when accessed within computer system 100 environment. Server computer 102 can include internal and external hardware components, as depicted and described in further detail with respect to FIG. 4.

Figure 2:
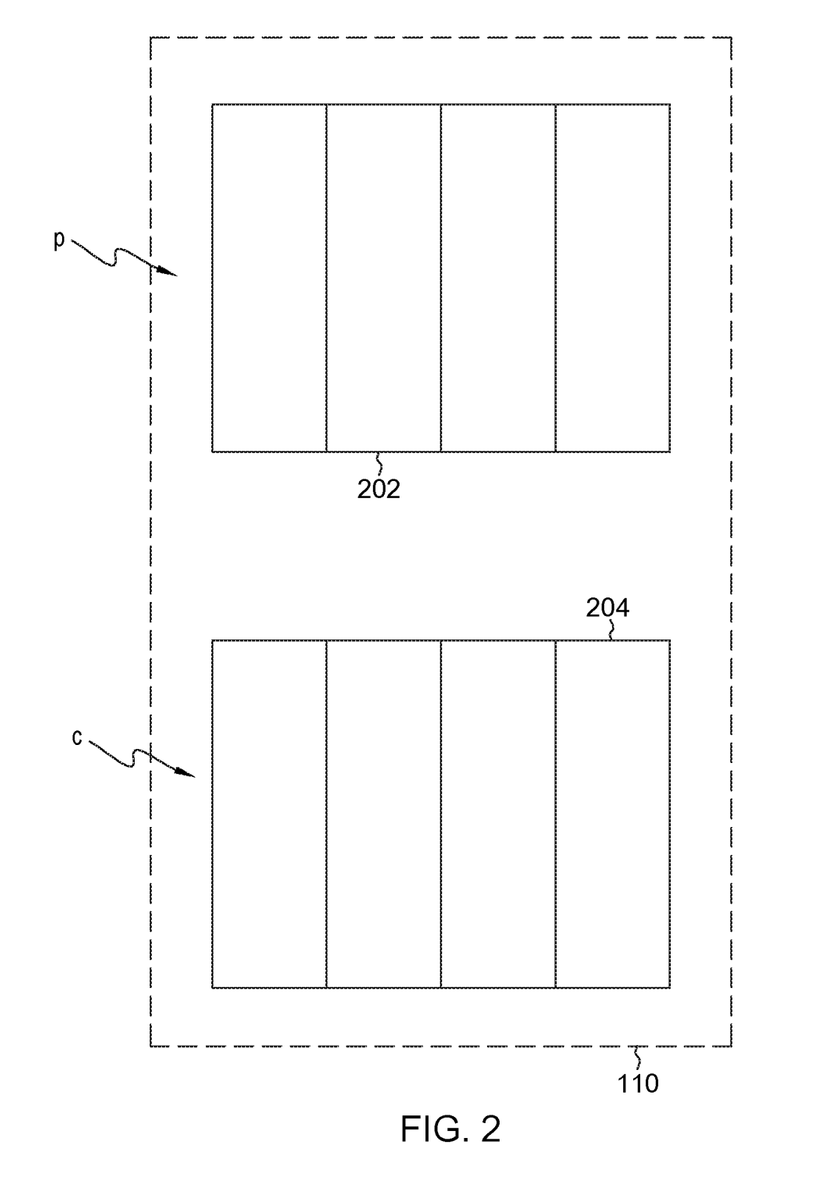
FIG. 2 is a schematic diagram of a database of the relational database management system of FIG. 1, in accordance with an embodiment of the present invention.

Turning to FIG. 2, a relational database 110 managed by the relational database management system 106 comprises partitioned tables p 202 and c 204, respectively defined as follows:

CREATE TABLE p(c1 int PRIMARY KEY, c2 char(20))
    FRAGMENT BY RANGE (c1)
    INTERVAL (100)
    STORE IN (p_dbs1, p_dbs2)
    PARTITION p_1 VALUES<100 IN p_dbs1;
    CREATE TABLE c(c1 int REFERENCES p, c2(char(20))
    FRAGMENT BY RANGE (c1)
    INTERVAL (100)
    STORE IN (c_dbs1, c_dbs2, c_dbs3)
    PARTITION c_1 VALUES<100 IN c_dbs1;

Accordingly, table p 202 contains a primary key c1, which is referenced by table c 204 and each of the tables 202, 204 are partitioned using primary key c1.

Figure 3:
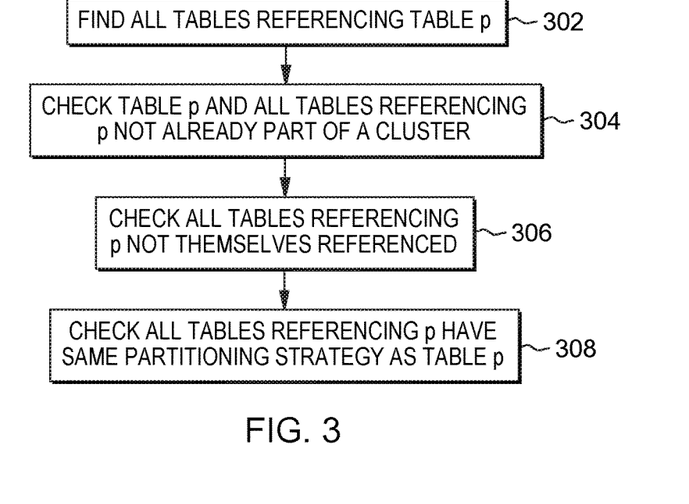
FIG. 3 is a flowchart showing the operation of a partition management system of the relational database management system of FIG. 2 when creating a cluster of database tables, in accordance with an embodiment of the present invention.

In accordance with an embodiment of the present invention, the two tables 202, 204 could be declared to be a "cluster" p_cluster, using a statement such as:

CREATE CLUSTER p_cluster ON p;

In response to such a cluster declaration, partition management system 108 of relational database management system 106 operates as shown in the flowchart of FIG. 3. First, at step 302 of an embodiment, partition management system 108 finds all tables of database 110 that reference table p 202, i.e. in the example of FIG. 2 this is (only) table c 204. Next, at step 304 of an embodiment, partition management system 108 checks that, table c 204 has the same partitioning strategy as table p 202. In particular, the partition management system 108 checks that table p 202 is partitioned using its primary key and that table c 204 is partitioned using the foreign key referencing that primary key, that they are both fragmented by RANGE, have the same INTERVAL value, and have the same number of fragments over the same values. If all these prerequisites are satisfied, the cluster p_cluster is successfully established. Accordingly the embodiments described herein maintain referential integrity. It should be noted that other appropriate prerequisites can be checked such as, but not limited to, table p 202 and table c 204 do not belong to any existing clusters, table c 204 is not itself referenced by another table of the database 110 and table p 202 and table c 204 have a maximum number of partitions. Further, an indication of the identity of a table can be received from tables such as, but not limited to table p 202 and table c 204.

Figure 4:
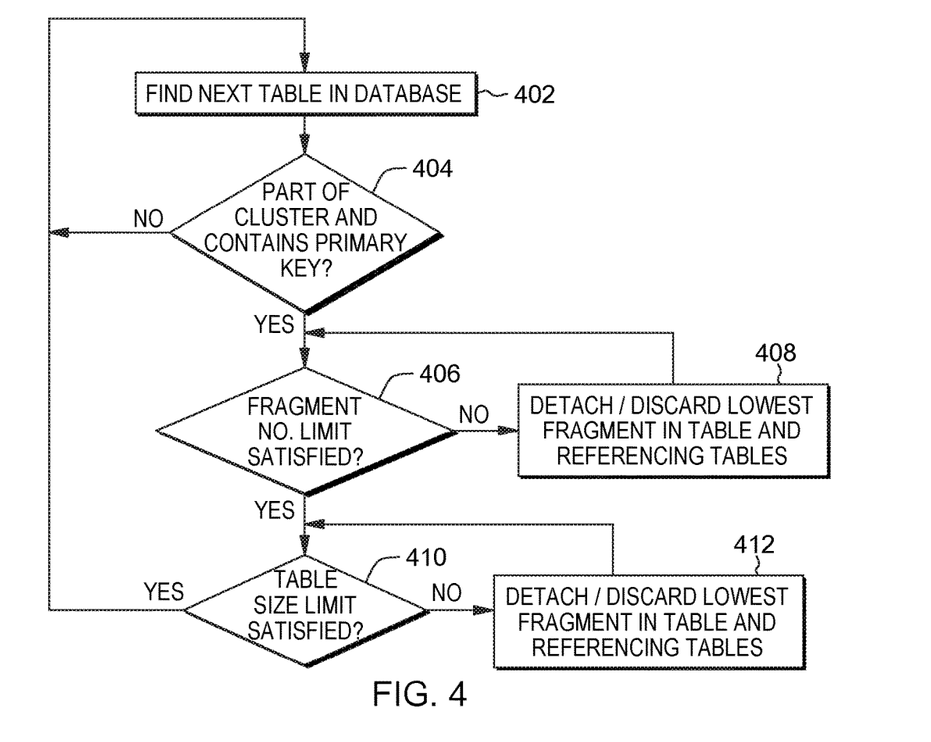
FIG. 4 is a flowchart showing the operation of the partition management system of the relational database management system when managing a cluster of database tables, in accordance with an embodiment of the present invention.

Once a cluster has been created, partitioning statements such as:

ALTER FRAGMENT ON TABLE . . . [ADD|ATTACH-|MODIFY|DROP|INIT]

are prevented on the tables within the cluster. Instead, a policy for managing the table p and table c is applied to the cluster p_cluster as a whole, using a statement such as:

ALTER FRAGMENT ON CLUSTER p_cluster MODIFY ROLLING (12) FRAGMENTS LIMIT TO 10 Gb DISCARD;

It will be appreciated that as an alternative, the policy could have been applied to the cluster as it was created, using a statement such as:

CREATE CLUSTER p_cluster ON p ROLLING (12) FRAGMENTS LIMIT TO 10 Gb DISCARD;

When implementing a table management policy of the relational database 110 such as the example given above, the partition management system 108 of the relational database management system 106 operates as shown in the flowchart of FIG. 4. The partition management system 108 considers each table in the relational database 110 in turn. Thus, at step 402, the partition management system 108 finds the next table in the database 110. The partition management system 108, at step 404, determines if the table is part of a cluster and contains the primary key used to define the cluster. If the table is not part of a cluster, the table is skipped and the next table in the database 110 is considered at step 402.

If the table being considered is part of a cluster and contains the primary key, for example the table is table p 202 in the cluster p_cluster defined above, the partition management system 108 identifies any limit on the number of fragments in the tables in the cluster p_cluster specified by the table management policy. For example, in the table management policy defined above, the statement "ROLLING (12) FRAGMENTS" gives a limit of 12 fragments. Further, at step 406 the partition management system 108 checks if the fragment number limit is satisfied by the table p 202, and also any other tables in the database 110 that reference the table p 202 (i.e. table c 204 in the cluster p_cluster). If the fragment number limit is not satisfied, i.e. table p 202 and/or table c 204 has more than 12 fragments, the lowest corresponding fragments from the tables are detached/discarded at step 408. The partition management system 14 then checks if the fragment number limit is now satisfied at step 406, and if not detaches/discards the lowest corresponding fragments again at step 408.

Once any fragment number limit is satisfied, the partition management system 108 identifies any limit on the size of the tables in the cluster p_cluster specified by the table management policy. In the table management policy defined above, the statement "LIMIT TO 10 Gb" gives a limit of 10 Gb for the combined size of tables in the cluster. Partition management system 108, at step 410, checks if the table size limit is satisfied by the tables in the cluster p_cluster, by determining their combined size. If the table size limit is not satisfied, e.g., the combined size of table p and table c is over 10 Gb, at step 412, the lowest corresponding fragments from the tables are detached/discarded. Further, partition management system 108 checks if the table size limit is now satisfied, step 410, and if not, detaches/discards the lowest corresponding fragments again at step 412.

Once the table size limit is satisfied, the policy for managing the cluster p_cluster is satisfied, and so partition management system 108 moves on to consider the next table in the database at step 402. It will of course be appreciated that the tables in relational database(s) 110 could be considered, and the clusters managed, in parallel, rather than in strictly linear sequence.

A pseudo-code algorithm syspurge( ) that implements the above behaviour is as follows:

```
syspurge( )
{
    -- Scan system catalogs
        -- For each ROLLING WINDOW table (ones with ROLLING and LIMIT
TO clauses of the CREATE TABLE)
            -- if this table is part of a cluster and not the table with the primary key
                -- skip it (it will be handled as part of the referenced table)
            -- Analyse the ROLLING clause info with the number of partitions in the
table.
                -- If the number of interval fragments is more than the specified
policy, then
                    -- for each interval fragment starting from the one with the
lowest value
                        -- if the table is part of a cluster
                            -- for each table referencing this table
                                -- DETACH/DISCARD the
fragment in the target referencing table
                        -- DETACH/DISCARD the fragment
            -- Analyse the LIMIT TO clause info with the total allocated size of the
table and referencing tables, if part of a cluster
                -- while the size of the table or cluster is greater than the specified
size limit, then
                    -- identify qualifying partition (range or interval if ANY
keyword used, interval if INTERVAL FIRST or ONLY keywords used, range if INTERVAL
FIRST keywords used and no interval fragment found)
                        -- if the table is part of a cluster
                            -- for each table referencing this table
                                -- DETACH/DISCARD the
fragment in the target referencing table
                        -- DETACH/DISCARD this fragment
                    -- until size is within limits
}
```

Once a cluster is no longer required, it can be discarded using a statement such as:

DROP CLUSTER p_cluster;

This reverts the tables within the cluster to be managed using their own fragmentation schemes; in this case the table management policy for the cluster is not used at all (i.e. not on any of the tables within the cluster), because it could not be applied to the tables in isolation without risking the occurrence of foreign key constraint violations.

In an alternative embodiment, the fragmentation could be tied to the table containing the primary key when created, for example as follows:

CREATE TABLE p(c1 int PRIMARY KEY, c2 char(20))
FRAGMENT BY RANGE (c1) CLUSTER
INTERVAL (100)
STORE IN (p_dbs1, p_dbs2)
PARTITION p_1 VALUES<100 IN p_dbs1;

Any tables being created that referenced this table would then not reference any fragmentation strategy, but would instead inherit the same strategy as the referenced table:

CREATE TABLE c(c1 int REFERENCES p, c2(char(20))
STORE IN (cdbs1, c_dbs2, c_dbs3)
PARTITION c_1 VALUES<100 IN c_dbs1;

In this way, any tables referencing the table containing the primary key will necessarily have the same fragmentation scheme. A management policy could as in the previous embodiment be defined using a statement such as:

ALTER FRAGMENT ON CLUSTER p_cluster MODIFY ROLLING (12) FRAGMENTS LIMIT TO 10 Gb DISCARD;

or similarly to the previous embodiment, could be alternatively be applied when the table defining the cluster is created:

CREATE TABLE p(c1 int PRIMARY KEY, c2 char(20))
    FRAGMENT BY RANGE (c1) CLUSTER ROLLING
    (12) FRAGMENTS LIMIT TO 10 Gb DISCARD
    INTERVAL (100)
STORE IN (p_dbs1, p_dbs2)
PARTITION p_1 VALUES<100 IN p_dbs1;

The tables can then be managed as described in the previous embodiment.

In the present embodiment, partitioning statements such as:

ALTER FRAGMENT ON TABLE . . . [ADD|ATTACH-|MODIFY|DROP|INIT]

are permitted, but only against the table in a cluster that contains the primary key, with the changes then being applied to all tables within the cluster rather than only to a single table in isolation.

Figure 5:
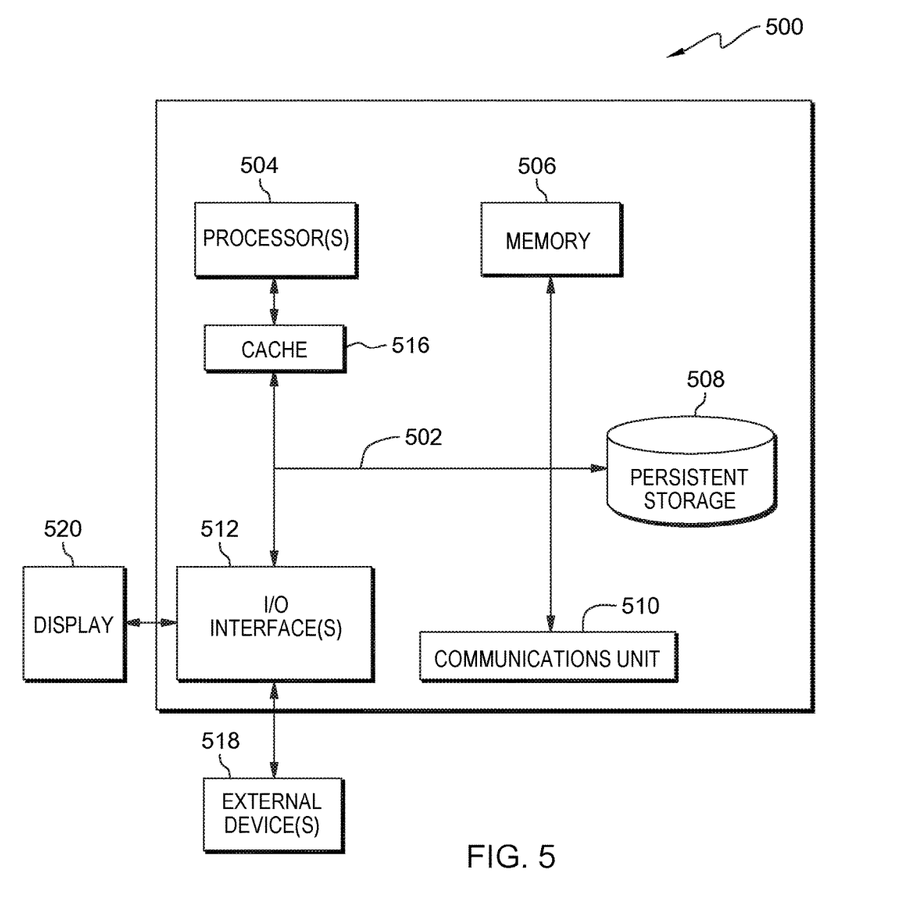
FIG. 5 is a block diagram of components of a server computer suitable for executing a relational database management system and a data store suitable for a relational database, in accordance with an embodiment of the present invention.

FIG. 5 depicts computer system 500, an example computer system representative of cruise control computer 502. Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Computer system 500 includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing fragmentation associated with a relational database, the relational database comprising:

a first table on which is defined a primary key, wherein data associated with the first table is divided into a first plurality of partitions;

at least one other table with a foreign key constraint that references the primary key of the first table, wherein data associated with the at least one other table is divided into a second plurality of partitions;

wherein each of the first plurality of partitions and each of the second plurality of partitions comprises data associated with a subset of values of the primary key; and the method comprising:

receiving a partition management policy, the partition management policy defining one or more conditions for the first table and the at least one other table and an operation to be performed upon the each of the first plurality of partitions and each of the second plurality of partitions and wherein the at least one other table inherits a fragmentation strategy from the first table based on the primary key associated with the first table;

determining if the first table and the at least one other table satisfy the one or more conditions of the partition management policy; and responsive to determining the one or more conditions of the partition management policy are not satisfied, performing the operation upon each of the first plurality of partitions and each of the second plurality of partitions.

2. The computer-implemented method of claim 1, wherein a condition of the one or more conditions is a maximum number of partitions for the first table and the at least one other table.

3. The computer-implemented method of claim 1, wherein a condition of the one or more conditions is a maximum combined size of the first table and the at least one other table.

4. The computer-implemented method of claim 1, wherein the operation upon the partitions of the first table and the at least one other table is discarding of a partition from the first table and a corresponding partition of the at least one other table.

5. The computer-implemented method of claim 1, further comprising:

receiving an indication of an identity of the first table and the at least one other table;

determining that the first table and the at least one other table are partitioned using the same partitioning strategy.

6. The computer-implemented method of claim 1, wherein each of the at least one other table are not referenced by any tables.

7. The computer-implemented method of claim 1, wherein each of the at least one other table do not reference a fragmentation strategy.

* * * * *